United States Patent [19]

Kojima

[11] Patent Number: 5,114,262
[45] Date of Patent: May 19, 1992

[54] HOLLOW CERAMIC PISTON PIN

[75] Inventor: Takio Kojima, Aichi, Japan

[73] Assignee: NGK Spark Plug Co., Ltd., Nagoya, Japan

[21] Appl. No.: 497,207

[22] Filed: Mar. 21, 1990

[30] Foreign Application Priority Data

Mar. 23, 1989 [JP] Japan .................. 1-32160[U]

[51] Int. Cl.⁵ ........................................ F16J 1/14
[52] U.S. Cl. ............................. 403/150; 403/161; 92/187; 29/888.05
[58] Field of Search ............. 403/150, 155, 157, 161, 403/152, 154, 30, 158, 28, 404; 92/187, 222; 29/888.05

[56] References Cited

U.S. PATENT DOCUMENTS

| | | | |
|---|---|---|---|
| 1,466,756 | 9/1923 | Rich | 403/150 X |
| 1,513,946 | 11/1924 | Vincent | 403/154 X |
| 1,852,663 | 4/1932 | Matthews | 403/150 X |
| 1,887,964 | 11/1932 | Steele | 403/150 |
| 2,059,713 | 11/1936 | Schneider | 403/154 X |
| 2,703,264 | 3/1955 | Pitner | 403/150 X |
| 3,702,092 | 11/1972 | Zollner | 403/154 X |
| 4,406,558 | 9/1983 | Kochendorfer et al. | 403/150 X |
| 4,696,224 | 9/1987 | Mishima | 92/187 |
| 4,756,240 | 7/1988 | Mielke | 403/150 X |

FOREIGN PATENT DOCUMENTS

| | | | |
|---|---|---|---|
| 63-4465 | 1/1988 | Japan. | |
| 637196 | 5/1950 | United Kingdom | 403/150 |

Primary Examiner—Peter M. Cuomo
Attorney, Agent, or Firm—Foley & Lardner

[57] ABSTRACT

A hollow ceramic piston pin has a pair of ribs in the form of partition walls axially separating the inside thereof. The piston pin has the ribs in the axial positions where it mates diameterially opposed inner ends of piston pin bosses of a piston and opposite ends of a small end portion of a connecting rod when attached to the piston and the connecting rod.

6 Claims, 4 Drawing Sheets

HOLLOW CERAMIC PISTON PIN

BACKGROUND OF THE INVENTION

1. Field of the Invention

The present invention relates in general to internal combustion engines and more particularly to a hollow ceramic piston pin for attaching a piston to a connecting rod in an internal combustion engine.

2. Description of the Prior Art

In order to meet the increasing demand for a high output internal combustion engine, a hollow ceramic piston pin has recently been utilized with a view to reducing the weight of a piston assembly.

A problem of the hollow ceramic piston pin is that it is liable to break at a portion joined with a connecting rod. To solve this problem, it has been proposed to make the hollow ceramic piston pin partially thick-walled at the portion joined with the connecting rod and grind the inner circumferential surface of the thick-walled portion for thereby increasing the breaking strength at minimum increase of the weight as disclosed in Japanese Utility Model Provisional Publication No. 63-4465. However, the piston pin proposed by Japanese Publication cannot efficiently increase the breaking strength but requires a difficult grinding process leading to considerable increase in cost.

SUMMARY OF THE INVENTION

In accordance with the present invention, there is provided an improved ceramic piston pin for attachment of a piston to a connecting rod. The piston has piston pin bosses with diametrically opposed inner ends. The connecting rod has a small end portion with ends opposed axially of the piston pin. The piston pin is hollow and has a pair of ribs axially separating the inside thereof. The piston pin has the ribs in the axial positions at which it mates the respective inner ends of the piston pin bosses of the piston and the respective ends of the small end portion of the connecting rod when attached to the piston and the connecting rod.

This structure is effective for solving the above noted problem inherent in the prior art device.

It is accordingly an object of the present invention to provide an improved hollow ceramic piston pin which can attain a sufficient breaking strength while reducing the weight.

It is another object of the present invention to provide an improved hollow ceramic piston pin of the above described character which is suited for use in a high output internal combustion engine.

DESCRIPTION OF THE PREFERRED EMBODIMENTS

Figure 1:
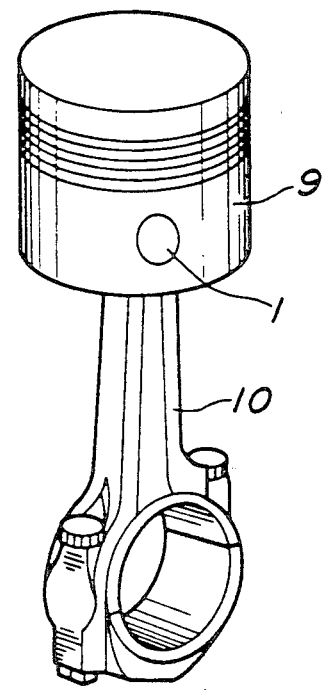
FIG. 1 is a perspective view of a piston and connecting rod assembly incorporating a hollow ceramic piston pin according to an embodiment of the present invention.
Figure 2:
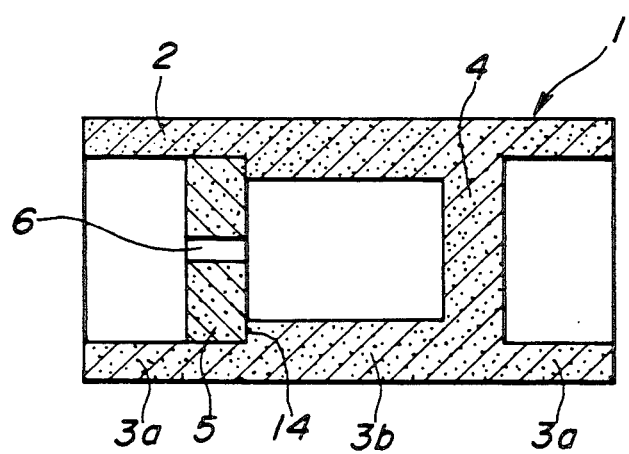
FIG. 2 is an enlarged sectional view of the hollow ceramic piston pin of FIG. 1.
Figure 3:
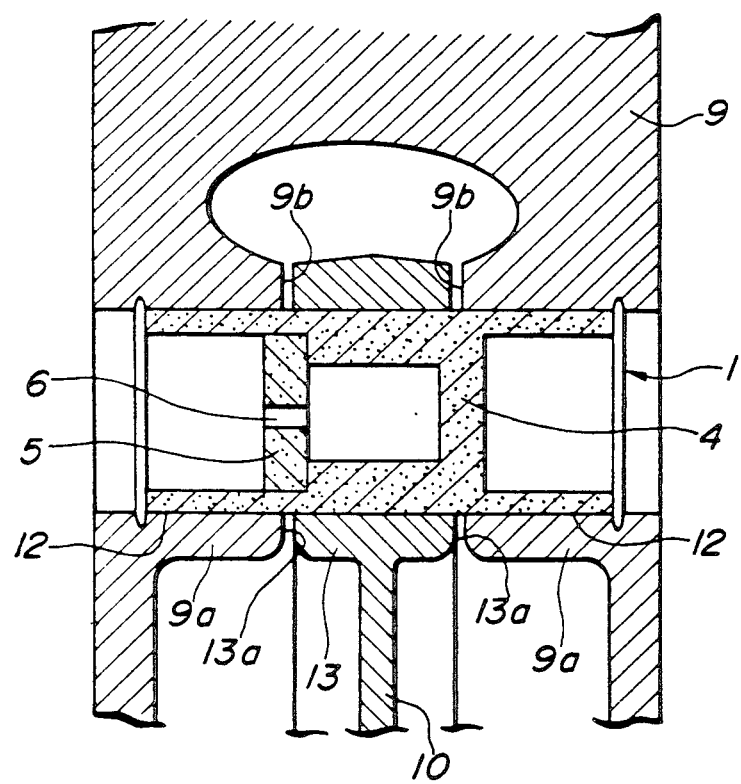
FIG. 3 is an enlarged sectional view of the hollow ceramic piston pin of FIG. 1 in the state of being joined with the piston and connecting rod.

Referring to FIGS. 1 to 3, a hollow ceramic piston pin 1 according to an embodiment of the present invention is used for attaching a piston 9 to a connecting rod 10 for transferring the combustion chamber pressures or movement of the piston 9 to the connecting rod 10. The piston 9 has a pair of apertured piston pin bosses 9a and 9a in which the piston pin 1 is fitted for attachment of the piston 9 to the connecting rod 10. The piston pin bosses 9a and 9a have inner ends 9b and 9b which are opposed diameterically of the piston 9. The connecting rod 10 has an apertured small end portion 13 interposed between the piston pin bosses 9a and 9a and attached to the piston pin 1. The small end portion 13 of the connecting rod 10 has, in the axial direction of the piston pin 1, the opposite ends 13a and 13a located adjacent to the respective inner ends 9b and 9b of the piston pin bosses 9a and 9a. Though not shown, the connecting rod 10 has a large end portion opposite to the small end portion 13 and is attached at the large end portion to a crankshaft.

The piston pin 1 includes a hollow cylindrical piston pin main body 2. The piston pin main body 1 has a rib 4 in the form of a partition wall axially separating the inside thereof, i.e., the rib 4 extends across the inside of the piston pin main body 2. In this connection, the piston pin main body 2 is formed with the rib 4 in the axial position where it mates one of the inner ends 9b and 9b of the piston pin bosses 9a and 9a, and one of the ends 13a and 13a of the small end portion 13 of the connecting rod 10, i.e., the piston pin main body 2 is formed with the rib 4 corresponding in position to one of the inner ends 9b and 9b of the piston pin bosses 9a and 9a and one of the ends 13a of the small end portion 13 of the connecting rod 10.

The hollow ceramic piston pin 1 further includes a circular plate member 5 installed in the piston pin main body 2 to constitute another rib in the form of a partition wall axially separating the inside thereof, i.e., the plate member 5 extends across the inside of the piston pin main body 2. The plate member 5 is installed in the piston pin main body 2 in the axial position thereof where the piston pin main body 2 mates the other one of the inner ends 9b and 9b of the piston pin bosses 9a and 9a and the other one of the ends 13a and 13a of the small end portion 13 of the connecting rod 10. The plate member 5 is formed with a concentric axial opening 6. The opening 6 is provided for communicating the inner space of the piston pin main body 2 between the rib 4 and the plate member 5 with the outside and thereby preventing breakage of the piston pin 1 due to expansion of heated air.

The piston pin main body 2 has a circumferential wall consisting of a pair of axially separated thin-walled portions 3a and 3a, and a thick-walled portion 3b therbetween. The rib 4 and the plate member 5 are located at the opposite ends of the thick-walled circumferential wall portion 3b so as to support the same from the inside of the piston pin main body 2. A shoulder 14 is formed in the inner circumferential surface of the piston pin main body 2 at a location between one thin-walled circumferential wall portion 3a and the thick-walled circumferential wall portion 3b. The plate member 5 is fitted in one thin-walled circumferential portion 3a so as to contact the shoulder 14.

In the foregoing, it is desirable to set the diameter of the opening 6 to be less than ⅓ of the inner diameter of the thin-walled circumferential wall portion 3a of the piston pin main body 2 such that the provision of the opening 6 does not cause substantial reduction in the strength of the piston pin 1.

In use, the hollow ceramic piston pin 1 is subject to large shearing forces in the axial positions mating the inner ends 9c and 9c of the piston pin bosses 9a and 9a and the ends 13a and 13a of the small end portion 13 of the connecting rod 10. In this connection, the hollow ceramic piston pin 1 has a sufficient strength for sustaining such shearing forces due to the effect of the rib 4, the plate member 5 and the thick-walled circumferential wall portion 3. The piston pin 1 is thus assuredly prevented from damage and breakage otherwise caused as in the prior art structure.

In production of the piston pin 1, a compact for the piston pin main body 2 is moulded from powder of $Si_3N_4$ under a pressure of 1500 Kg/cm² using a press. A compact for the plate member 5 is moulded from the same powder under a pressure of 1700 Kg/cm² using a press. The compacts for the piston pin main body 2 and the plate member 5 are assembled together and baked to form the one-piece piston pin 1. In this connection, the shrinkage percentages of the compacts for the piston pin main body 2 and the plate member 5 at baking are respectively set to be 17% and 16% so that there is not caused any clearance or gap between the joining portions of the piston pin main body 2 and the plate member 5 after baking.

In the foregoing, it is to be noted that the rib 4 is formed integral with the piston pin main body 2 at the stage of forming the compact whereas the compact for the plate member 5 is formed independently of the compact for the piston pin main body 2 and integrally joined with same at the stage of baking.

It is further to be noted that after baking the plate member 5 serves as a rib of the piston pin 1 similarly to the rib 4.

The ceramic piston pin 1 was subjected to vibrations of 5000 G in the axial direction thereof for testing for its breaking strength, and it was confirmed that no damage was caused in the piston pin after completion of the test.

Figure 4A:
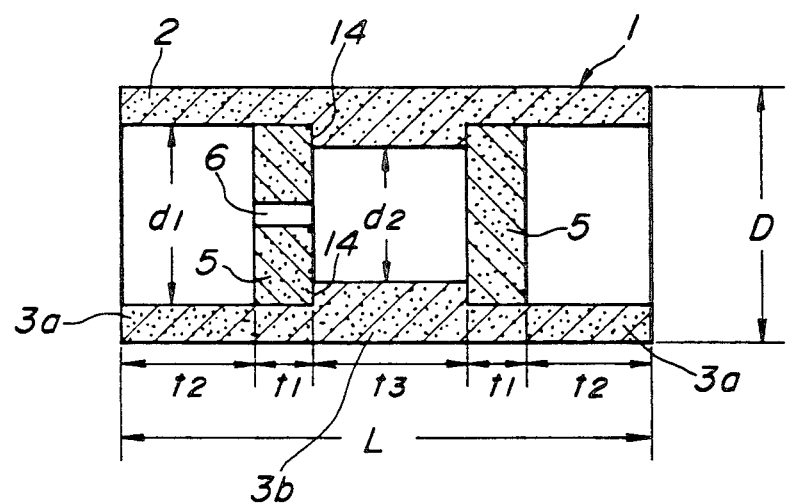
FIG. 4A is a sectional view similar to FIG. 2 but shows another embodiment of the present invention.
Figure 4B:
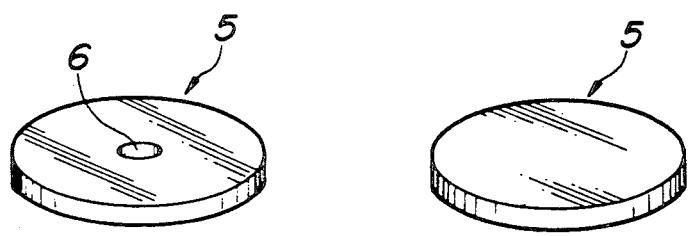
FIG. 4B is a perspective view of a pair of plate members employed in the piston pin of FIG. 4A.

FIGS. 4A and 4B show another embodiment which is substantially similar to the previous embodiment of FIGS. 1 to 3 except that another plate member 5 is employed in place of the rib 4. In this connection, one of the plate members 5 and 5 is solid and the other one is formed with the concentric opening 6 as shown in FIG. 4B. The compacts for the piston pin main body 2 and the plate members 5 and 5 may be moulded under the pressure of 1500 Kg/cm² using a press. The plate members 5 and 5 are then subjected to cutting so that the outer diameter of each plate member 5 is, for example, 0.02 mm less than the inner diameter of the corresponding thin-walled circumferential wall portion 3a of the piston pin main body 2. Thereafter, the both are fitted together under hydrostatic pressure of 2000 Kg/cm².

The joining portions of the compacts for each plate member 5 and the piston pin main body 2 are, for example, sized so that the piston pin main body 2 is 18 mm in inner diameter at the joining portion and each plate member 5 is 17.9 mm in outer diameter. After baking, an example of the hollow ceramic piston pin 1 has such dimensions that the overall axial length L is 60 mm, the outer diameter D is 20 mm, the inner diameter d1 at the thin-walled circumferential wall portions 3a is 15 mm, the inner diameter d2 at the thick-walled circumferential wall portion 3b is 12 mm, the thickness t1 of each plate member 5 is 5 mm, the distance t2 between an end of the piston pin main body 2 and its adjacent plate member 5 is 16 mm and the axial length t3 of the thick-walled circumferential wall portion 3b is 18 mm.

Figure 5:
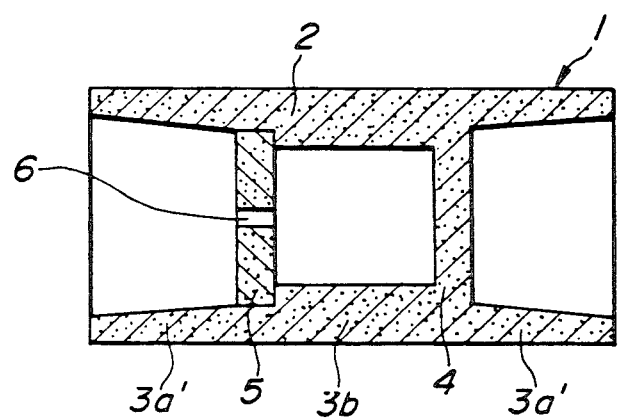
FIG. 5 is a sectional view similar to FIG. 2 but shows a further embodiment of the present invention.

FIG. 5 shows a further embodiment which is substantially similar to the embodiment of FIGS. 1 to 3 except that the thin-walled circumferential wall portions 3a' and 3a' of the piston pin main body 2 are so shaped as to gradually increase in thickness as they axially extend increasingly from the respective ends of the piston pin main body 2 to the axial positions where they mate the respective outer axial ends of the rib 4 and the plate member 5. Such a gradual variation of the thickness of the circumferential wall of the piston pin main body 2 enables the ceramic piston pin 1 to bend smoothly when subjected to a bending stress and thereby weakening the shearing force to act upon the piston pin 1.

Figure 6A:
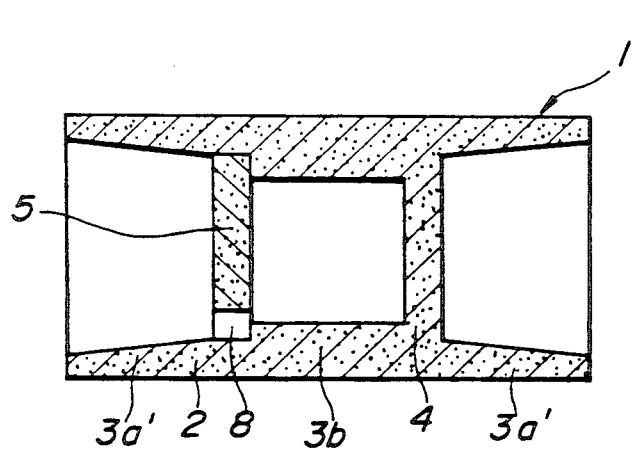
FIG. 6A is a sectional view similar to FIG. 2 but shows a still further embodiment of the present invention.
Figure 6B:
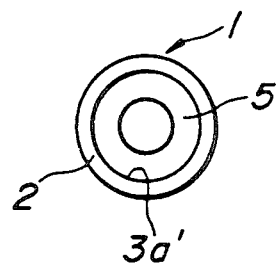
FIG. 6B is a side elevational view of the hollow ceramic piston pin of FIG. 6A on a reduced scale.

FIGS. 6A and 6B show a further embodiment which is substantially similar to the embodiment of FIG. 5 except that, in place of the concentric opening 6 formed in the plate member 5, a notch 8 is formed in the peripheral portion of the plate member 5. With such a notch, substantial reduction of the breaking strength of the piston pin 1 can be prevented ore efficiently and assuredly.

The above described embodiments were tested for breaking load. The test result is shown in the following Table.

In the Table, the prior art example 1 and the prior art example 2 are hollow ceramic piston pins of 12 mm and 10 mm in inner diameter, respectively. The prior art example 3 is a solid ceramic piston pin. The inventions 1 to 3 correspond to the embodiments of FIGS. 1-3, FIG. 6 and FIG. 7, respectively.

| | Result of test for breaking load | |
| --- | --- | --- |
| | Weight (g) | Breaking load (ton) |
| Invention 1 | 36 | 8.5 9 |
| Invention 2 | 36 | 8 8.5 |
| Invention 3 | 36 | 8 9 |
| Prior Art 1 | 39 | 4.5 5.5 |
| Prior Art 2 | 46 | 6 7.5 |
| Prior Art 3 | 61 | 10 11 |

From this Table, it will be understood that this invention makes it possible to considerably reduce the weight of the piston pin 1 and increase the strength against breakage.

From the foregoing, it will be understood that the present invention makes it possible to increase the breaking strength of a hollow ceramic piston pin while reducing the weight.

What is claimed is:

1. An internal combustion engine comprising a piston having piston pin bosses with diametrically opposed inner ends, a connecting rod having a small end portion with opposite ends facing said inner ends, respectively, and a hollow ceramic piston pin having a pair of circular ribs axially separating the inside thereof and a circumferential wall consisting of a pair of axially separated thin-walled circumferential wall portions and a uniformly thick-walled circumferential wall portion therebetween, said ribs being located at opposite axial ends of said thick-walled circumferential wall portion, one of said ribs being formed with a concentric air vent in the form of a concentric opening and the other of sad ribs being solid, a diameter of said air vent being less than ⅓ of an inner diameter of said thin-walled circumferential wall portion with which it is joined, said piston pin having said ribs in axial positions thereof at which it mates the respective inner ends of the piston pin bosses of the piston and the respective ends of the small end portion of the connecting rods when attaching the piston to the connecting rod.

2. The internal combustion engine as claimed in claim 1 wherein said thin-walled circumferential wall portions gradually increase in thickness as they extend from respective outer axial ends of said piston pin toward the respective portions of said ribs.

3. A ceramic piston pin for attachment of a piston to a connecting rod in an internal combustion engine, the piston having a pair of piston pin bosses with diametrically opposed inner ends and the connecting rod having a small end portion with ends opposed axially of the piston pin, said ceramic piston pin comprising:
 a hollow cylindrical piston pin main body having a circumferential wall consisting of a pair of axially separated thin-walled circumferential wall portions and a uniformly thick-walled circumferential wall portion therebetween; and
 a pair of circular ribs disposed within said piston pin main body to axially separate the inside of the same, said ribs being located at opposite axial ends of said thick-walled circumferential wall portion, one of said ribs being formed with an air vent and the other of said ribs being solid, a diameter of said air vent being less than ⅓ of an inner diameter of one of said thin-walled circumferential wall portions with which said one rib is joined;
 said piston pin main body having said ribs in axial positions thereof where it mates the respective inner ends of the piston pin bosses of the piston and the respective ends of the small end portion of the connecting rod.

4. The ceramic piston as claimed in claim 3 wherein said thin-walled circumferential wall portions gradually increase in thickness as they extend from respective outer axial ends of said piston main body toward the respective positions of said ribs.

5. A ceramic piston pin for attachment of a piston to a connecting rod in an internal combustion engine, the piston having a pair of piston bosses with diametrically opposed inner ends and the connecting rod having a small end portion with ends opposed axially of the piston pin, said ceramic piston pin comprising:
 a hollow cylindrical piston pin main body having a circumferential wall consisting of a pair of axially separated thin-walled circumferential wall portions and a uniformly thick-walled circumferential wall portion therebetween; and,
 a pair of circular ribs disposed within said piston pin main body to radially close the inside of said thick-walled circumferential wall portion, said ribs being located at opposite axial ends of said thick-walled circumferential wall portion, one of said ribs being formed at a peripheral portion thereof with an air vent in the form of a notch and the other of said ribs being solid;
 said piston pin main body having said ribs in axial positions thereof where it mates the respective inner ends of the piston bosses of the piston and the respective ends of the small end portion of the connecting rods.

6. A method of producing a ceramic piston pin for attachment of a piston to a connecting rod, wherein the piston has piston pin bosses with diametrically opposed inner ends, the connecting rod has a small end portion with opposite ends facing said inner ends, respectively, and the ceramic piston pin has a pair of ribs axially separating the inside thereof and a circumferential wall consisting of a pair of axially separated thin-walled circumferential wall portions and a uniformly thick-walled circumferential wall portion therebetween, the piston pin having the ribs in axial positions thereof at which it mate the respective inner ends of the piston pin bosses of the piston and the respective ends of the small end portion of the connecting rods when attached to the piston and the connecting rod, the method comprising the steps of:
 preparing a first compact for one of said ribs independently from a second compact for a remaining part of said ceramic piston pin, said compact for said one rib having an opening a diameter of which, after baking, is less than ⅓ of an inner diameter of said thin-walled circumferential wall portion with which it is to be joined;
 preparing said second compact for said remaining part of said ceramic piston pin;
 assembling said first and second compacts together; and
 baking said assembled compacts while allowing said opening to serve as an air vent.

* * * * *